US012683099B2

(12) United States Patent
Zhang et al.

(10) Patent No.: US 12,683,099 B2
(45) Date of Patent: Jul. 14, 2026

(54) ECG BUTTON ASSEMBLY AND ELECTRONIC DEVICE

(71) Applicant: HUAWEI TECHNOLOGIES CO., LTD., Shenzhen (CN)

(72) Inventors: Kemin Zhang, Dongguan (CN); Menglong Zhao, Xi'an (CN); Qian He, Xi'an (CN); Wenjian Yang, Dongguan (CN); Zhuang Liu, Shenzhen (CN); Nan Lin, Dongguan (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 18/701,428

(22) PCT Filed: Oct. 31, 2023

(86) PCT No.: PCT/CN2023/128896
§ 371 (c)(1),
(2) Date: Apr. 15, 2024

(87) PCT Pub. No.: WO2024/094033
PCT Pub. Date: May 10, 2024

(65) Prior Publication Data

US 2025/0266219 A1 Aug. 21, 2025

(30) Foreign Application Priority Data

Oct. 31, 2022 (CN) ......................... 202222900444.3

(51) Int. Cl.
*H01H 13/14* (2006.01)
*H01H 13/06* (2006.01)
(Continued)

(52) U.S. Cl.
CPC ............ *H01H 13/06* (2013.01); *H01H 13/10* (2013.01); *H01H 13/52* (2013.01); *H01H 2013/525* (2013.01)

(58) Field of Classification Search
CPC .. H01H 13/14; H01H 13/04; H01H 2239/074; H01H 25/06; H01H 2223/002;
(Continued)

(56) References Cited

U.S. PATENT DOCUMENTS

| | | | | |
|---|---|---|---|---|
| 11,194,298 B2 * | 12/2021 | Roach | .................... | G04G 9/007 |
| 2020/0110365 A1 * | 4/2020 | Hitsumoto | ............. | G04B 3/048 |
| 2022/0043397 A1 * | 2/2022 | Ely | ........................ | G04C 3/001 |

FOREIGN PATENT DOCUMENTS

| | | |
|---|---|---|
| CN | 209436418 U | 9/2019 |
| CN | 212783169 U | 3/2021 |

(Continued)

OTHER PUBLICATIONS

International Search Report and Written Opinion in International Appln. No. PCT/CN2023/128896, mailed on Jan. 20, 2024, 13 pages (with partial English translation).

(Continued)

*Primary Examiner* — Ahmed M Saeed
(74) *Attorney, Agent, or Firm* — Fish & Richardson P.C.

(57) ABSTRACT

This application relates to electrocardiogram (ECG) button assemblies and electronic devices. An example ECG button assembly includes a button part, a plastic tube, a metal tube, an elastic piece, and a conductive sheet. The housing is provided with a via hole, and the plastic tube is embedded in the via hole. A first through hole is provided at an interior of the plastic tube, the metal tube is embedded in the first through hole, the conductive sheet is connected to one end that is of the metal tube and that is located at an interior of
(Continued)

the housing, and the conductive sheet is in contact with and electrically connected to a circuit board.

20 Claims, 7 Drawing Sheets

(51) Int. Cl.
*H01H 13/10* (2006.01)
*H01H 13/52* (2006.01)

(58) Field of Classification Search
CPC ............. H01H 2231/028; H01H 13/06; H01H 13/705; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

FOREIGN PATENT DOCUMENTS

| | | | | | |
|---|---|---|---|---|---|
| CN | 215911337 | U | | 2/2022 | |
| CN | 114220688 | A | | 3/2022 | |
| CN | 219040306 | U | | 5/2023 | |
| CN | 114093702 | B | * | 4/2024 | ............. H01H 13/14 |
| EP | 3451117 | A1 | | 3/2019 | |
| WO | 2020211336 | A1 | | 10/2020 | |

OTHER PUBLICATIONS

Extended European Search Report in European Appln. No. 25217219.2, mailed on May 20, 2026, 9 pages.

* cited by examiner

ECG BUTTON ASSEMBLY AND ELECTRONIC DEVICE

CROSS-REFERENCE TO RELATED APPLICATIONS

This application is a National Stage of International Patent Application No. PCT/CN2023/128896, filed on Oct. 31, 2023, which claims priority to Chinese Patent application Ser. No. 202222900444.3, filed on Oct. 31, 2022, both of which are hereby incorporated by reference in their entireties.

TECHNICAL FIELD

This application relates to the field of electronic device technologies, and in particular, to an ECG button assembly and an electronic device.

BACKGROUND

An electrocardiogram (electrocardiogram, ECG) may reflect a health status of a user. For example, the ECG may reflect a heart disease (such as arrhythmia). Therefore, an ECG function is added to an increasing quantity of electronic devices during design and production of the electronic devices. Currently, an ECG button of an electronic device having the ECG function is usually in a square shape. In the shape of the square button, an ECG channel is as follows: button cap-spring support-screw-conductive sheet, and the conductive sheet is locked and attached to a button holder through the screw. Due to large occupied space of the ECG button, when a size of an electronic device is small, the space of the ECG button is limited.

SUMMARY

This application provides an ECG button assembly and an electronic device, so that a size of the ECG button assembly may be further reduced and an ECG circuit is conducted.

According to a first aspect, this application provides an ECG button assembly. The ECG button assembly is used in an electronic device, and the electronic device may include a housing and a circuit board located in the housing. The ECG button assembly includes a button part, a plastic tube, a metal tube, an elastic piece, and a conductive sheet. The housing is provided with a via hole, and the plastic tube may be embedded in the via hole. A first through hole is provided at an interior of the tube, the metal tube may be embedded in the first through hole, and a part of the metal tube is located at an exterior of the housing. The conductive sheet is connected to one end that is of the metal tube and that is located at an interior of the housing, and the conductive sheet is in contact with and electrically connected to the circuit board. The button part may include a button cap and a button shaft, a second through hole is provided at an interior of the metal tube, the button shaft may penetrate through the second through hole, a first end of the button shaft is located at the exterior of the housing, and the button cap is connected to the first end of the button shaft. The elastic piece is sleeved on the button shaft, one end of the elastic piece is connected to the button cap, the other end of the elastic piece is connected to the metal tube, and the button part is capable of moving in an axial direction of the button shaft relative to the housing.

In the ECG button assembly provided in this application, the button part, the elastic piece, the metal tube, and the conductive sheet are disposed. Because the foregoing mechanical parts all have a conductive characteristic, a conduction circuit of an ECG may be as follows: button cap-elastic piece-metal tube-conductive sheet-circuit board, to conduct an ECG circuit. In addition, the ECG button assembly in this application does not need an existing screw, and does not depend on the button shaft for conducting electricity, so that a conductive structure and an internal structure of the housing may be designed adaptively, to reduce a size of the ECG button assembly.

In some possible implementation solutions, a tube nut may be further disposed. The tube nut is located at one end that is of the metal tube and that is away from the button cap. The tube nut is provided with a threaded hole, the metal tube and the tube nut are assembled in a threaded manner, and the conductive sheet is connected to a side that is of the tube nut and that is away from the metal tube. By disposing the tube nut, the tube nut may not only position the metal tube, but also conduct a circuit.

In some possible implementation solutions, after passing through the conductive sheet, a second end of the button shaft is located at a side that is of the conductive sheet and that is away from the metal tube, a limiting part is provided at the second end of the button shaft, and the limiting part is disposed around the button shaft. When the button part is in an initial state, the limiting part abuts against a surface of the side that is of the conductive sheet and that is away from the metal tube; and when the button part is pressed, the limiting part is detached from the conductive sheet. By disposing the limiting part, the button shaft may be limited when the button part is in the initial state, to avoid that the button shaft is detached from the housing.

In some possible implementation solutions, the housing includes a metal layer and a plastic layer. The plastic layer is located at a side that is of the metal layer and that faces the interior of the housing, to improve aesthetics of the electronic device.

In some possible implementation solutions, a part of the plastic tube may be located at an interior of the button cap, and in the axial direction of the button shaft, a distance between the button cap and the plastic tube is less than a distance between the button cap and the metal layer. In this way, when the button cap is pressed, the button cap may be prevented from being in contact with the metal layer. This avoids that a conduction circuit of an ECG is affected.

In some possible implementation solutions, the distance between the button cap and the metal layer ranges from 0.15 mm to 0.2 mm. The distance may prevent the button cap from being in contact with the metal layer, and may further avoid that the electronic device is not beautiful because too many parts of the button cap protrude from the housing.

In some possible implementation solutions, the metal layer is provided with an opening, a side surface that is of the plastic tube and that faces the button cap is flush with a surface that is of the plastic layer and that faces the metal layer, the plastic tube is exposed from the opening, and a part that is of the metal tube and that is located at the exterior of the housing abuts against the side surface that is of the plastic layer and that faces the metal layer. The plastic tube is exposed from the opening of the metal layer, so that contact between the metal tube and the metal layer may be avoided.

In some possible implementation solutions, a part of the metal tube is located in the button cap, and an outer diameter of the plastic tube is greater than or equal to a diameter of the button cap. Because the outer diameter of the plastic tube is greater than or equal to the diameter of the button cap, when the button cap is pressed, even if a surface of the button cap is in contact with a surface of the housing, the surface of the button cap is in contact with the plastic layer. This may better avoid contact between the button cap and the metal layer.

In some possible implementation solutions, a gasket may be provided on the part that is of the metal tube and that abuts against the plastic layer. By disposing the gasket, not only the metal tube and the plastic layer may be fastened, but also sealing performance of a joint part between the metal tube and the plastic layer may be improved.

In some possible implementation solutions, the plastic tube and the plastic layer may be of an integrated structure. This may facilitate reducing process costs.

In some possible implementation solutions, a flange is provided on a side that is of the conductive sheet and that is away from the button part, and the conductive sheet is in contact with the circuit board through the flange, to ensure that the conductive sheet is in stable contact with and electrically connected to the circuit board.

In some possible implementation solutions, the circuit board is provided with a spring sheet, and the circuit board is in contact with the conductive sheet through the spring sheet, to ensure that the conductive sheet is in stable contact with and electrically connected to the circuit board.

In some possible implementation solutions, a first sealing ring is provided between the button shaft and the metal tube, to improve waterproof performance between the button shaft and the metal tube.

In some possible implementation solutions, a second sealing ring is provided between the metal tube and the plastic tube, to improve waterproof performance between the metal tube and the plastic tube.

According to a second aspect, this application provides an electronic device. The electronic device includes a housing and the ECG button assembly according to any possible implementation solution of the first aspect, where the ECG button assembly may be disposed on the housing.

The electronic device in this application not only may implement an ECG function, but also may facilitate controlling a size of the housing, so that the electronic device is more beautiful as a whole.

REFERENCE NUMERALS

Figure 1:
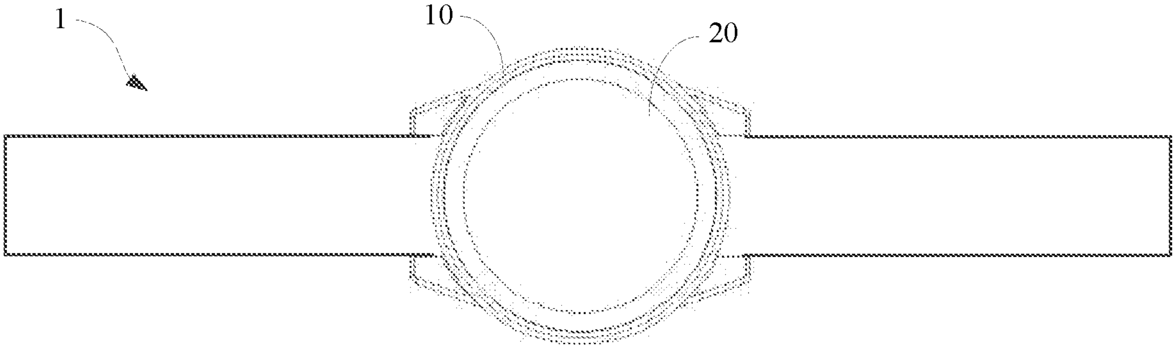
FIG. 1 is a schematic diagram of a structure of a wearable device according to an embodiment of this application.

1: wearable device; 10: housing; 110: metal layer; 120: plastic layer; 130: circuit board; 140: spring sheet; 20: display assembly; 30: ECG button assembly; 310: button part; 311: button shaft; 3111: limiting part; 312: button cap; 320: elastic piece; 330: plastic tube; 331: clamping part; 340: metal tube; 350: tube nut; 360: conductive sheet; 361: flange; 370: first sealing ring; 380: second sealing ring; and 390: gasket.

DESCRIPTION OF EMBODIMENTS

Terms used in the following embodiments are merely intended to describe specific embodiments, but are not intended to limit this application. Terms “one”, “a”, “the”, “the foregoing”, “this”, and “the one” of singular forms used in this specification and the appended claims of this application are also intended to include forms such as “one or more”, unless otherwise specified in the context clearly.

Reference to “an embodiment”, “some embodiments”, or the like described in this specification indicates that one or more embodiments of this application include a specific feature, structure, or characteristic described with reference to the embodiments. Therefore, statements such as “in an embodiment”, “in some embodiments”, “in some other embodiments”, and “in other embodiments” that appear at different places in this specification do not necessarily mean references to a same embodiment. Instead, the statements mean “one or more but not all of embodiments”, unless otherwise specifically emphasized in another manner. Terms “include”, “comprise”, “have”, and their variants all mean “include but are not limited to”, unless otherwise specifically emphasized in another manner.

With the development of ECG technologies, an ECG button becomes a necessary design of an electronic device. Currently, a conduction path disposed with the ECG button is usually in a square shape. In this shape of the square button, an ECG channel is: button cap-spring support-screw-conductive sheet, and the conductive sheet may be locked and attached to a button holder through the screw. To ensure that the conductive sheet is fastened to the button holder, two screws are usually disposed. This results in a large size of the ECG button. When a size of an electronic device is small, the ECG button does not have sufficient space, and a function of the ECG button is affected.

Based on this, embodiments of this application provide an ECG button part and an electronic device, so that a size of the ECG button assembly can be further reduced and conduction of the ECG button assembly can be ensured. The following describes in detail a structure of the ECG button assembly and the electronic device with reference to specific embodiments.

The ECG button assembly in embodiments of this application may be used in various electronic devices having an EGC function. The electronic device may be a wearable electronic device, for example, a watch, a band, a headset, or a helmet (for example, a virtual reality helmet), and may alternatively be a non-wearable device, for example, a portable electronic device having an ECG detection function, for example, a mobile phone, a tablet computer, or a notebook computer. An example embodiment of the portable electronic device includes but is not limited to a portable electronic device using iOS®, Android®, Microsoft®, or another operating system. It should be understood that the electronic device may not be a portable electronic device, but is a desktop computer that can detect an ECG. This is not limited in embodiments of this application. The following embodiments of this application are described by using an example in which the electronic device is a wearable device.

Figure 2:
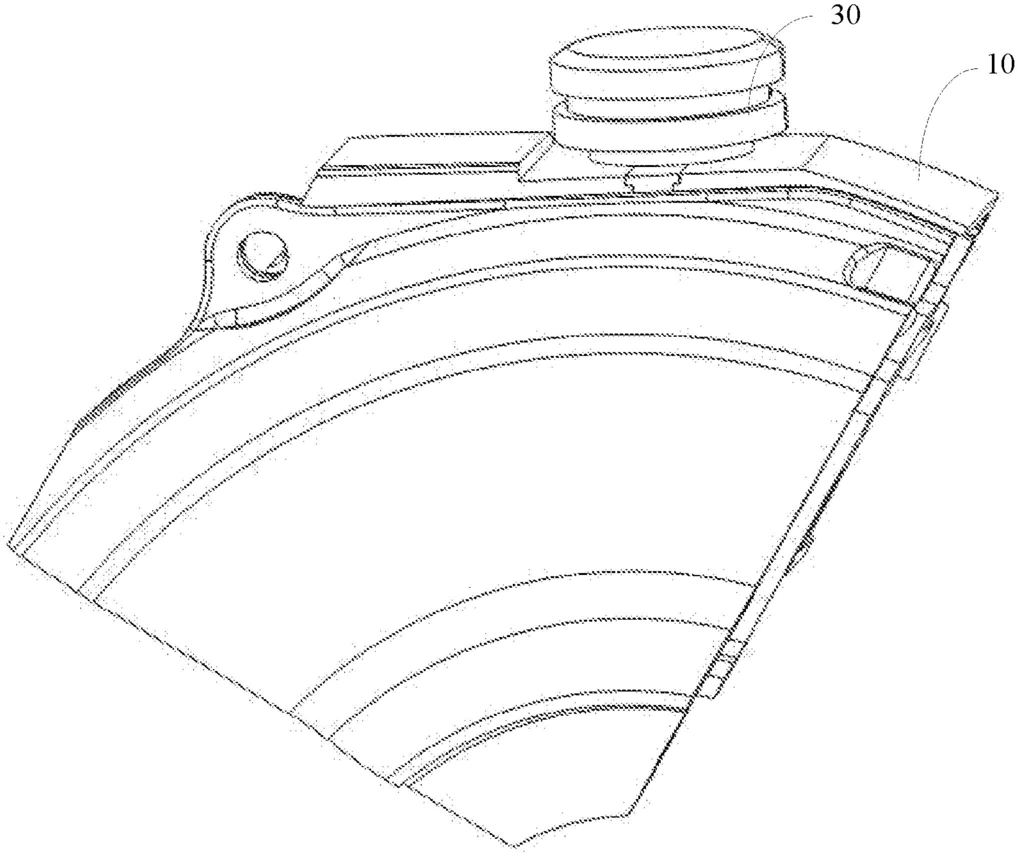
FIG. 2 is a schematic diagram of a partial structure of a wearable device according to an embodiment of this application.

Refer to FIG. 1 and FIG. 2. FIG. 1 is a schematic diagram of a structure of a wearable device 1 according to an embodiment of this application, and FIG. 2 is a schematic diagram of a partial structure of a wearable device according to an embodiment of this application. The wearable device 1 may include a housing 10, a display assembly 20, and an ECG button assembly 30. The display assembly 20 is disposed on the housing 10. One side of the display assembly 20 may be exposed to an exterior of the housing 10, to facilitate a user to view information of the wearable device 1 through the display assembly 20. The ECG button assembly 30 may be disposed on a side edge of the housing 10, and a circuit board (not shown in the figure) is disposed at an interior of the housing 10. The circuit board may be a flexible printed circuit 130 (flexible printed circuit, FPC) or a printed circuit board (printed circuit board, PCB). A part of the ECG button assembly 30 may be located at the interior of the housing 10, and is connected to the circuit board to implement circuit conduction, to implement an ECG function of the wearable device 1.

Figure 3:
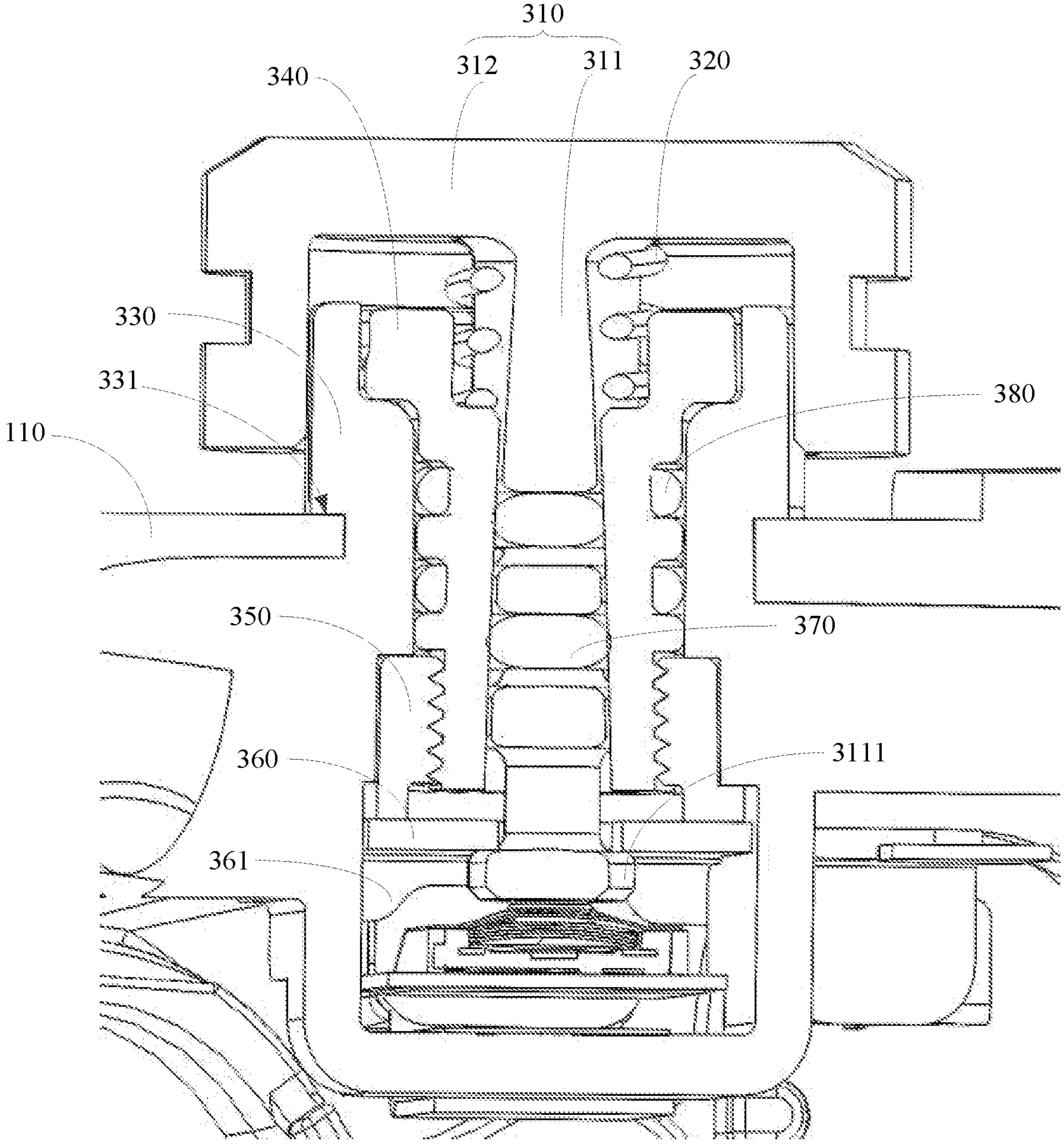
FIG. 3 is a schematic diagram of a cross-sectional structure of an ECG button assembly in FIG. 2.

Refer to FIG. 2 and FIG. 3. FIG. 3 is a schematic diagram of a sectional structure of the wearable device 1 in FIG. 2. The ECG button assembly 30 may include a button part 310, a plastic tube 330, a metal tube 340, an elastic piece 320, and a conductive sheet 360. A side wall of the housing 10 may be provided with a via hole. The plastic tube 330 may be embedded in the via hole. A part of the plastic tube 330 is located at the exterior of the housing 10, and a part of the plastic tube 330 is located at the interior of the housing 10. Specifically, the plastic tube 330 may be of a cylindrical structure or a square structure. A clamping part 331 is provided on a part that is of the plastic tube 330 and that is located in the housing 10. A size of the clamping part 331 may be greater than a diameter of the via hole. The clamping part 331 may be clamped to an inner surface of the housing 10, to ensure that the plastic tube 330 is not detached, through the via hole, from the housing 10.

A first through hole is provided at an interior of the plastic tube 330, and the metal tube 340 may be embedded in the first through hole. Specifically, a first step structure may be provided on a side that is of the plastic tube 330 and that is located at the exterior of the housing 10, and a second step structure may be provided on the metal tube 340. When the metal tube 340 is embedded in the plastic tube 330, the second step structure may fit the first step structure, so that the metal tube 340 is relatively fastened to the housing 10 under an action of the first step structure. One end of the metal tube 340 may be located at the exterior of the housing 10, and a surface of the end that is of the metal tube 340 and that is located at the exterior of the housing 10 is lower than a surface of one end that is of the plastic tube 330 and that is located at the exterior of the housing 10, that is, the metal tube 340 is located at the interior of the plastic tube 330.

One end that is of the metal tube 340 and that is located at the interior of the housing 10 may be fastened to the plastic tube 330 through a tube nut 350. The tube nut 350 is provided with a threaded hole, and a thread is provided on a part that is of the metal tube 340 and that is located in the tube nut 350. In this way, the metal tube 340 may be connected to the tube nut 350 through threaded matching. In addition, a side that is of the tube nut 350 and that is away from the metal tube 340 may protrude in a circumferential direction of the tube nut 350. After the tube nut 350 is connected to the metal tube 340 in a threaded manner, the protruding part may alternatively be located between the plastic tube 330, to cooperate with the clamping part of the plastic tube 330 to position the plastic tube 330, and keep the plastic tube 330 fastened to the housing 10.

Figure 4:
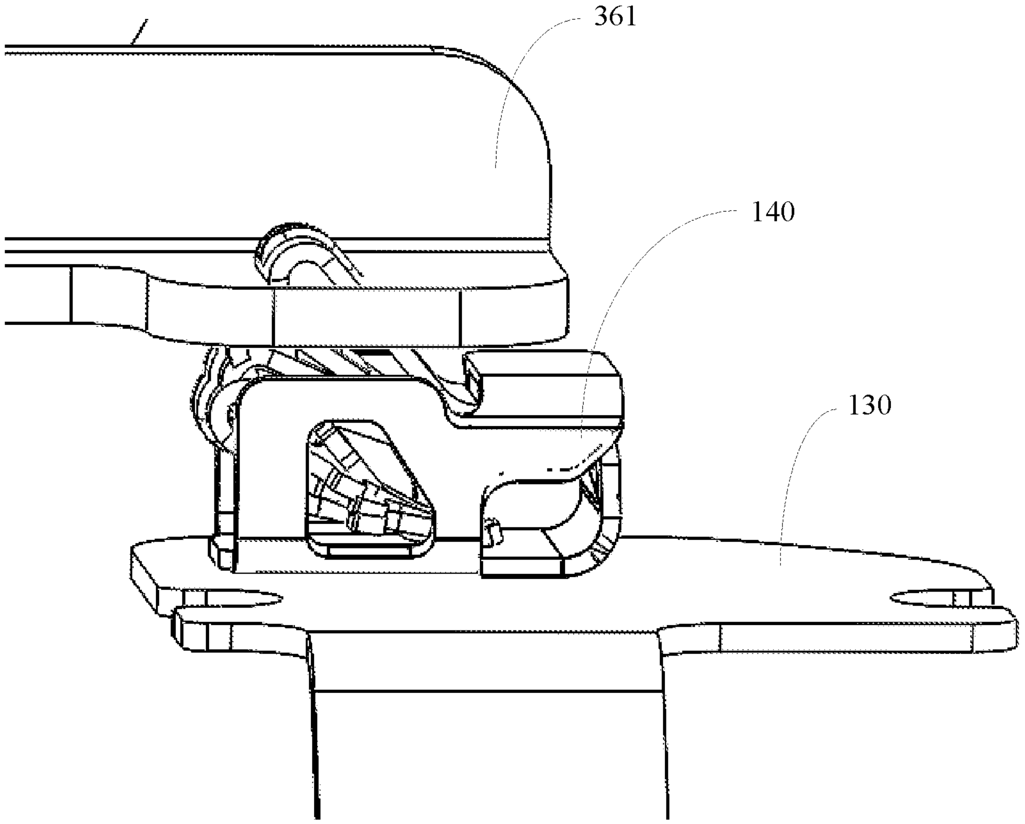
FIG. 4 is a schematic diagram of a structure of a connection between a conductive sheet and a circuit board of the wearable device in FIG. 2.

With reference to FIG. 3 and FIG. 4. FIG. 4 is a schematic diagram of a structure of a connection between a conductive sheet of the wearable device in FIG. 2 and a circuit board. The conductive sheet 360 may be fastened to the side that is of the tube nut 350 and that is away from the metal tube 340. For example, the conductive sheet 360 may be connected to the tube nut 350 in a welding manner. A flange 361 is provided on a side that is of the conductive sheet 360 and that is away from the metal tube 340. A circuit board 130 is provided with a spring sheet 140. The conductive sheet 360 may be in contact with the spring sheet 140 through the flange 361, to be electrically connected to the circuit board 130.

As shown in FIG. 3, the button part 310 may include a button cap 312 and a button shaft 311. A second through hole is provided at an interior of the metal tube 340. A first end of the button shaft 311 is located at the exterior of the housing 10, and a second end of the button shaft 311 may be located at the interior of the housing 10 after sequentially passing through the second through hole, the tube nut 350, and the conductive sheet 360. The button cap 312 is connected to the first end of the button shaft 311. The plastic tube 330 may be located in the button cap 312 and has a specific distance from a bottom of the button cap 312. The elastic piece 320 may be a spring. The elastic piece 320 may be sleeved on the button shaft 311, one end of the elastic piece 320 may be connected to the button cap 312, and the other end of the elastic piece 320 is connected to the metal tube 340. In this embodiment, when the user presses the button cap 312, the button shaft 311 may be driven to move in an axial direction of the button shaft 311 relative to the housing 10, so that the button shaft 311 may be in contact with other parts in the housing 10. It may be understood that, when the button cap 312 is pressed, because the end that is of the elastic piece 320 and that is connected to the metal tube 340 is fastened, the elastic piece 320 may be compressed and store a force. After the pressing force on the button cap 312 is loosen, the elastic piece 320 may be restored under an elastic force, to drive the button cap 312 to be restored.

The button cap 312 and the button shaft 311 may be of an integrated structure or a split structure. This is not limited in this embodiment.

It should be understood that a conduction circuit of the ECG button assembly 30 in this embodiment may be as follows: button cap 312-elastic piece 320-metal tube 340-tube nut 350-conductive sheet 360-circuit board 130. Because an electrical connection between the ECG button assembly 30 and the circuit board 130 does not depend on the button shaft 311, and the ECG button assembly 30 and the circuit board 130 are connected through another metal mechanical part instead, another metal structure may be designed adaptively based on a structure of the housing 10. A size of the ECG button assembly 30 may be reduced and circuit conduction is ensured.

A limiting part 3111 may be provided at the second end of the button shaft 311, and the limiting part 3111 may be disposed around the button shaft 311. When the button part 310 is in an initial state (that is, is not pressed), because the elastic piece 320 has a function of moving the button cap 312 away from the housing 10 for the button cap 312, the limiting part 3111 may abut against a surface of the side that is of the conductive sheet 360 and that is away from the metal tube 340, to limit the button shaft 311. When the button part 310 is pressed, the button shaft 311 moves away from the conductive sheet 360. In this case, the limiting part 3111 is detached from the conductive sheet 360.

Figure 5:
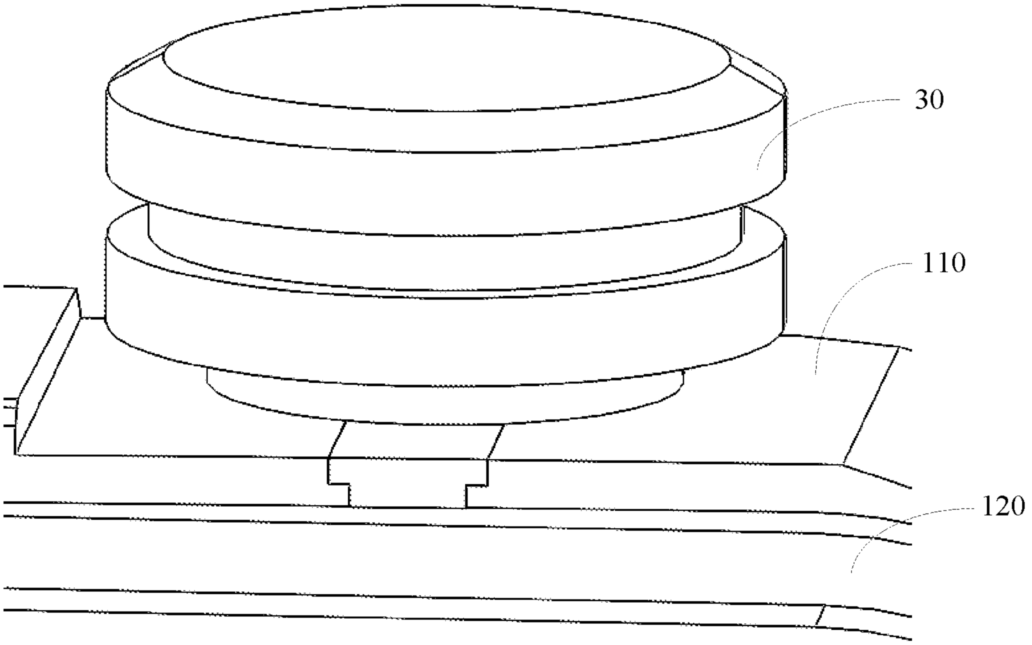
FIG. 5 is a schematic diagram of an enlarged structure of an ECG button assembly in FIG. 2.

With reference to FIG. 3 and FIG. 5. FIG. 5 is a schematic diagram of an enlarged structure of an ECG button assembly in FIG. 2. In this embodiment, a side wall of the housing 10 may include a plastic layer 120 or include a plastic layer 120 and a metal layer 110. When the housing 10 includes the plastic layer 120 and the metal layer 110, the plastic layer 120 is located at the interior, and the metal layer 110 is located at the exterior. It may be understood that the wearable device 1 may be more attractive in appearance by disposing the metal layer 110. In addition, the plastic tube 330 and the plastic layer 120 may alternatively be of an integrated structure. Because the button cap 312 is conductive, when the housing 10 includes the metal layer 110, a distance between the button cap 312 and the metal layer 110 may be greater than a distance between the plastic tube 330 and the bottom of the button cap 312. When the button cap 312 is pressed, an edge of the button cap 312 is capable of moving close to the metal layer 110. In a movement process of the button cap 312, the plastic tube 330 is first in contact with the button cap 312, and limits the button cap 312, so that the button cap 312 does not continue moving towards the metal layer 110, that is, prevents the button cap 312 from being in contact with the metal layer 110. This avoids that circuit conduction of an ECG is affected.

For example, a distance between the edge of the button cap 312 and the metal layer 110 may range from 0.15 mm to 0.2 mm. In this way, the button cap 312 does not protrude from the housing 10 too much, and contact between the button cap 312 and the metal layer 110 may also be avoided.

It should be noted that, when the housing 10 includes only the plastic layer 120, a distance between the edge of the button cap 312 and the plastic layer 120 may be greater than or equal to the distance between the bottom of the button cap 312 and the plastic tube 330.

In addition, a first sealing ring 370 may be disposed between the button shaft 311 and the metal tube 340. The first sealing ring 370 may be wound around the button shaft 311, to improve waterproof performance between the button shaft 311 and the metal tube 340. Specifically, a first groove may be provided on the button shaft 311 in a circumferential direction of the button shaft 311, the first sealing ring 370 may be clamped into the first groove, and the first sealing ring 370 abuts against a side wall of the metal tube 340. There may be one or two or more first sealing rings 370. When there are two or more first sealing rings 370, the plurality of first sealing rings 370 may be arranged in an axial direction of the button shaft 311.

A second sealing ring 380 may be disposed between the metal tube 340 and the plastic tube 330, and the second sealing ring 380 may be wound around the metal tube 340, to improve waterproof performance between the metal tube 340 and the plastic tube 330. Specifically, a second groove may be disposed on the metal tube in a circumferential direction of the metal tube 340, the second sealing ring 380 may be clamped into the second groove, and the second sealing ring 380 abuts against a side wall of the plastic tube 330. There may be one or two or more second sealing rings 380. When there are two or more second sealing rings 380, a plurality of second sub-sealing rings may be arranged in an axial direction of the metal tube 340.

Figure 6:
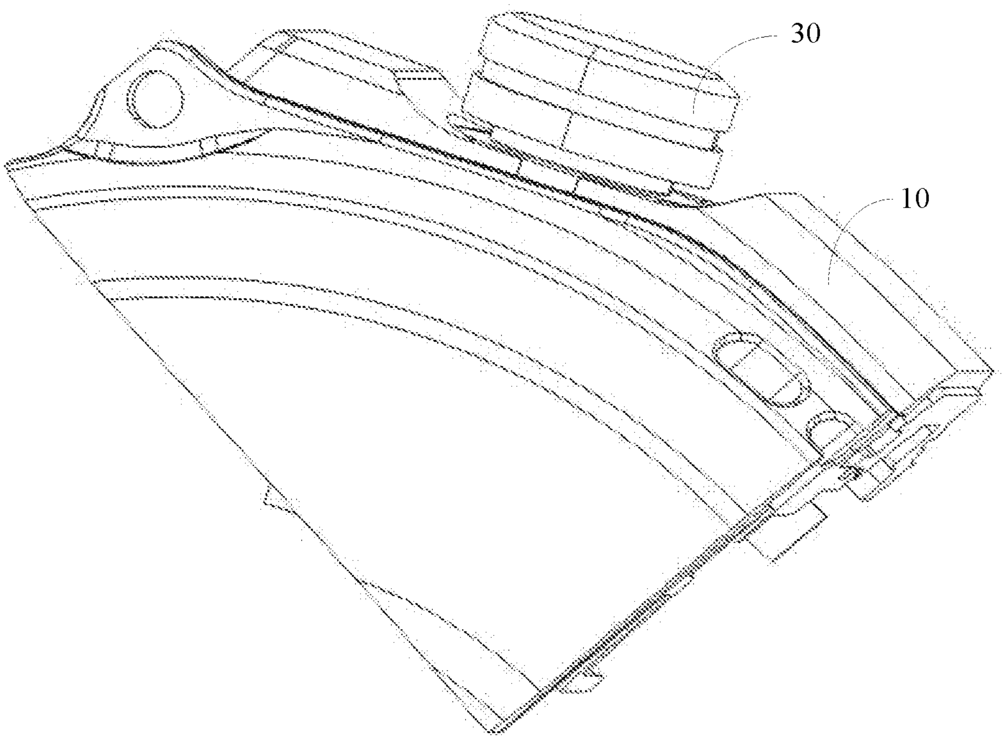
FIG. 6 is a schematic diagram of a partial structure of another wearable device according to an embodiment of this application.
Figure 8:
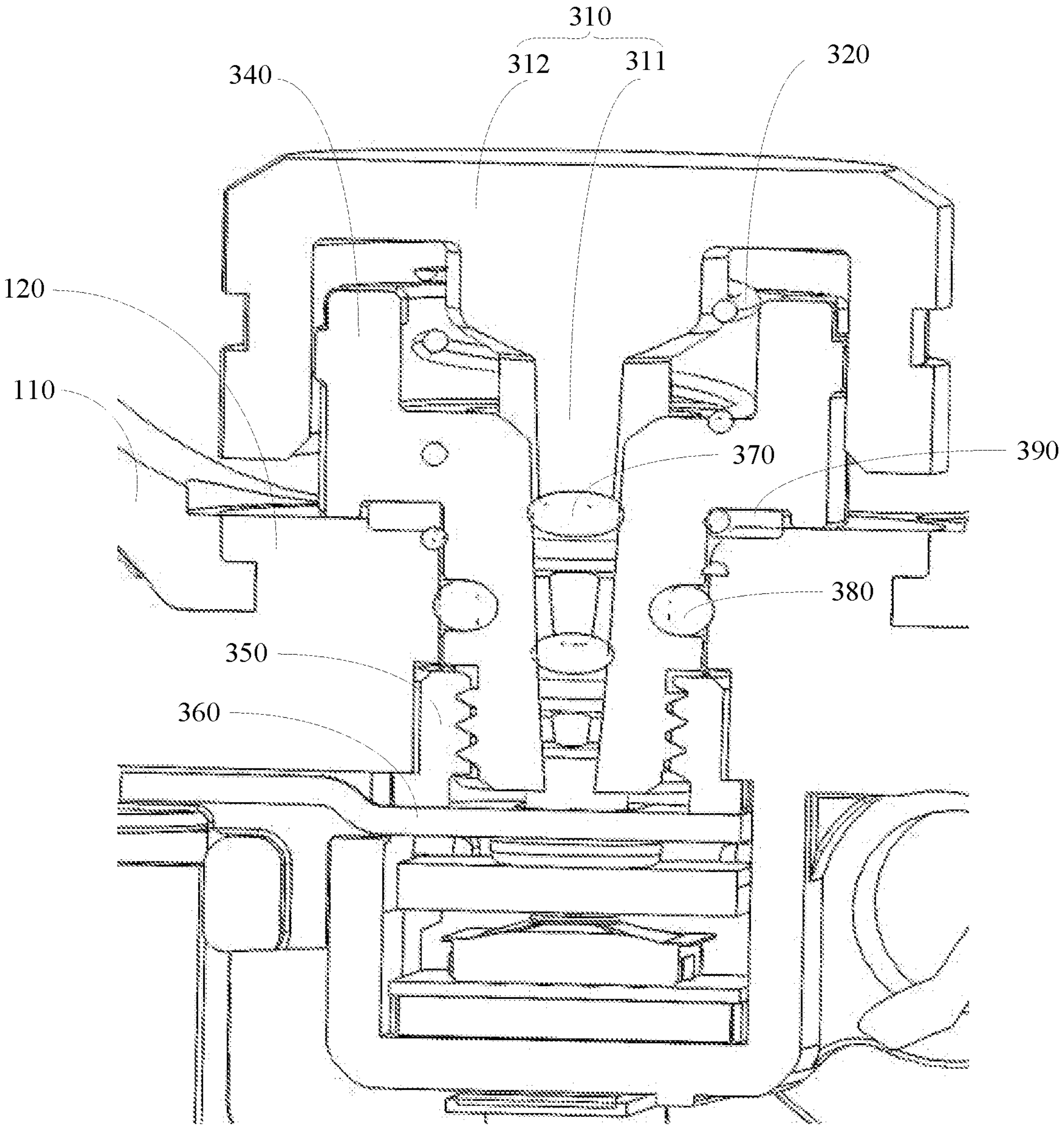
FIG. 8 is a schematic diagram of a cross-sectional structure of an ECG button assembly in FIG. 6.

Refer to FIG. 6 and FIG. 8. FIG. 6 is a schematic diagram of a partial structure of another wearable device according to an embodiment of this application, and FIG. 8 is a schematic diagram of a cross-sectional structure of an ECG button assembly in FIG. 6. In this embodiment, a housing 10 may include a metal layer 110 and a plastic layer 120, and an ECG button assembly 30 may include a button part, a metal tube 340, a tube nut 350, an elastic piece 320, and a conductive sheet 360.

The metal layer 110 is provided with an opening, and the plastic layer 120 is provided with a via hole. After the metal tube 340 passes through the opening of the metal layer 110 and the via hole of the plastic layer 120, one end of the metal tube 340 is located at an interior of the housing 10, and the other end of the metal tube is located at an exterior of the housing 10. The tube nut 350 is located at one end of the metal tube 340 that is located at the interior of the housing 10, and is connected to the metal tube 340 in a threaded manner. The conductive sheet 360 is fastened to a side that is of the tube nut 350 and that is away from the metal tube 340, and the conductive sheet 360 is configured to be in contact with and electrically connected to a circuit board 130. The button part includes a button shaft 311 and a button cap 312. A first end of the button cap 312 is located at the exterior of the housing 10, and a second end of the button cap 312 is located at the interior of the housing 10 after sequentially passing through the metal tube 340, the tube nut 350, and the conductive sheet 360. The elastic piece 320 is sleeved on the button shaft 311, one end of the elastic piece 320 is connected to the button cap 312, and the other end of the elastic piece is connected to the metal tube 340. It may be understood that, in this embodiment, a conduction circuit of the ECG button assembly 30 is: button cap 312-elastic piece 320-metal tube 340-tube nut 350-conductive sheet 360-circuit board 130.

A diameter of the opening of the metal layer 110 is greater than a diameter of the via hole of the plastic layer 120. Specifically, the diameter of the opening of the metal layer 110 is greater than or equal to a diameter of the button cap 312, that is, a part of the plastic layer 120 that directly faces the opening is exposed from the opening. A diameter of a part that is of the metal tube 340 and that is located at the exterior of the housing 10 is greater than a diameter of a part that is of the metal tube 340 and that is located in the housing 10, so that the metal tube 340 has a step structure. A surface of the step structure that is perpendicular to an axial direction of the metal tube 340 is located at the exterior of the housing 10, and abuts against a side surface that is of the plastic layer 120 and that faces the metal layer 110, so that the metal tube 340 and the plastic layer 120 are relatively fastened. During specific implementation, a gasket 390 may be disposed between a step surface of the metal tube 340 and the plastic layer 120, to ensure a stable connection relationship between the step surface of the metal tube 340 and the plastic layer 120.

It may be understood that, when the diameter of the opening of the metal layer 110 is greater than the diameter of the button cap 312, an edge of the button cap 312 directly faces a structure of the plastic layer 120, that is, the button cap 312 may be in direct contact with the plastic layer 120 without affecting circuit conduction of an ECG. Therefore, a relationship between a size between the edge of the button cap 312 and the plastic layer 120 and a size between a bottom of the button cap 312 and the metal tube 340 is not limited in this embodiment.

In addition, it should be noted that the ECG button assembly 30 in this embodiment may also be considered as including a plastic tube. A side surface that is of the plastic tube and that faces the button cap 312 is flush with a surface of the plastic layer 120, and the plastic tube and the plastic layer 120 are of an integrated structure.

Figure 7:
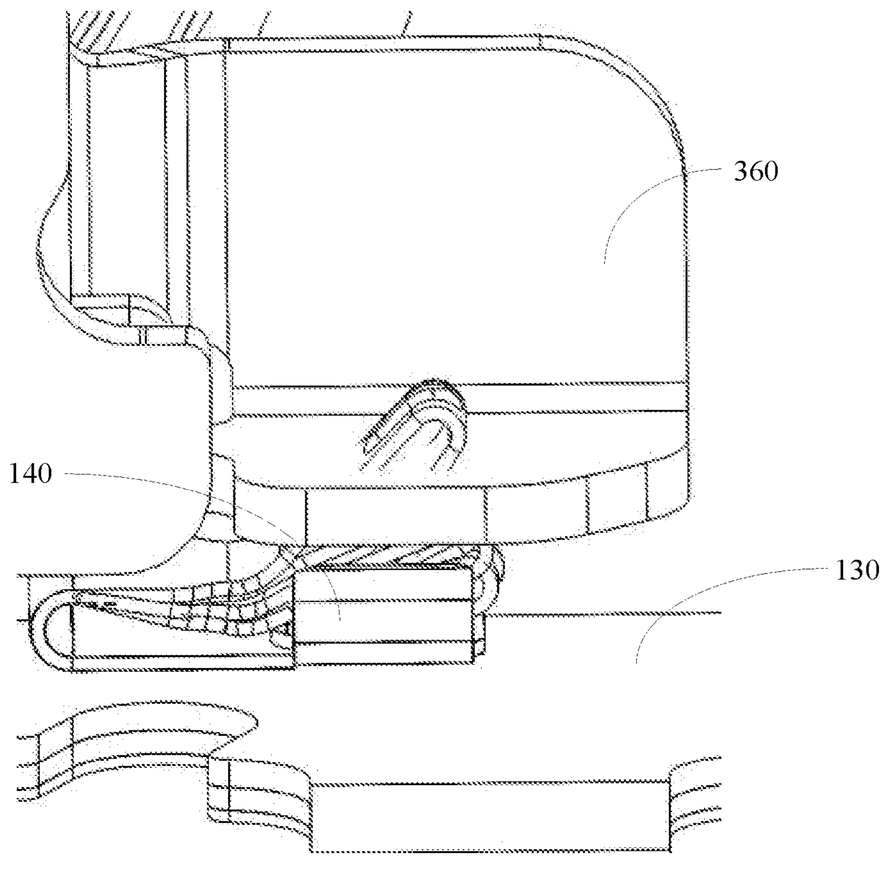
FIG. 7 is a schematic diagram of a structure of a connection between a conductive sheet of the wearable device in FIG. 6 and a circuit board.

FIG. 7 is a schematic diagram of a structure of a connection between a conductive sheet of the wearable device in FIG. 6 and a circuit board. As an implementation solution, a spring sheet 140 may be disposed on the circuit board 130, and the conductive sheet 360 may be electrically connected to the circuit board 130 through the spring sheet 140.

It may be understood that the housing in embodiments of this application may be a metal housing, a non-metal housing, or a metal and non-metal injection-molding housing. This is not limited in this embodiment.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application should be subject to the protection scope of the claims.

What is claimed is:

1. An electrocardiogram (ECG) button assembly, used in an electronic device, wherein:

the electronic device comprises a housing and a circuit board located in the housing, and the ECG button assembly comprises a button part, a plastic tube, a metal tube, an elastic piece, and a conductive sheet;

the housing is provided with a via hole, and the plastic tube is embedded in the via hole;

a first through hole is provided at an interior of the plastic tube, the metal tube is embedded in the first through hole, a part of the metal tube is located at an exterior of the housing, the conductive sheet is connected to one end that is of the metal tube and that is located at an interior of the housing, and the conductive sheet is in contact with and electrically connected to the circuit board;

the button part comprises a button cap and a button shaft, a second through hole is provided at an interior of the metal tube, the button shaft penetrates through the second through hole, a first end of the button shaft is located at the exterior of the housing, and the button cap is connected to the first end of the button shaft; and the elastic piece is sleeved on the button shaft, one end of the elastic piece is connected to the button cap, the other end of the elastic piece is connected to the metal tube, and the button part is configured to move in an axial direction of the button shaft relative to the housing.

2. The ECG button assembly according to claim 1, wherein the ECG button assembly further comprises a tube nut, and the tube nut is located at one end that is of the metal tube and that is away from the button cap;

the tube nut is provided with a threaded hole, and the metal tube and the tube nut are assembled in a threaded manner; and the conductive sheet is connected to a side that is of the tube nut and that is away from the metal tube.

3. The ECG button assembly according to claim 1, wherein after passing through the conductive sheet, a second end of the button shaft is located at a side that is of the conductive sheet and that is away from the metal tube, a limiting part is provided at the second end of the button shaft, and the limiting part is disposed around the button shaft; and when the button part is in an initial state, the limiting part abuts against a surface of the side that is of the conductive sheet and that is away from the metal tube, and when the button part is pressed, the limiting part is detached from the conductive sheet.

4. The ECG button assembly according to claim 1, wherein the housing comprises a metal layer and a plastic layer, and the plastic layer is located at a side that is of the metal layer and that faces the interior of the housing.

5. The ECG button assembly according to claim 4, wherein a part of the plastic tube is located at an interior of the button cap, and in the axial direction of the button shaft, a distance between the button cap and the plastic tube is less than a distance between the button cap and the metal layer.

6. The ECG button assembly according to claim 5, wherein the distance between the button cap and the metal layer ranges from 0.15 mm to 0.2 mm.

7. The ECG button assembly according to claim 4, wherein the metal layer is provided with an opening, a side surface that is of the plastic tube and that faces the button cap is flush with a surface that is of the plastic layer and that faces the metal layer, the plastic tube is exposed from the opening, and a part that is of the metal tube and that is located at the exterior of the housing abuts against the side surface that is of the plastic layer and that faces the metal layer.

8. The ECG button assembly according to claim 7, wherein a part of the metal tube is located in the button cap, and an outer diameter of the plastic tube is greater than or equal to a diameter of the button cap.

9. The ECG button assembly according to claim 7, wherein a gasket is provided on the part that is of the metal tube and that abuts against the plastic layer.

10. The ECG button assembly according to claim 4, wherein the plastic tube and the plastic layer are of an integrated structure.

11. The ECG button assembly according to claim 1, wherein a flange is provided on a side that is of the conductive sheet and that is away from the button part, and the conductive sheet is in contact with the circuit board through the flange.

12. The ECG button assembly according to claim 1, wherein the circuit board is provided with a spring sheet, and the circuit board is in contact with the conductive sheet through the spring sheet.

13. The ECG button assembly according to claim 1, wherein a first sealing ring is provided between the button shaft and the metal tube.

14. The ECG button assembly according to claim 1, wherein a second sealing ring is provided between the metal tube and the plastic tube.

15. An electronic device, comprising a housing and the ECG an electrocardiogram (ECG) button assembly, wherein:

the ECG button assembly is disposed on the housing, and the ECG button assembly comprises a button part, a plastic tube, a metal tube, an elastic piece, and a conductive sheet;

the housing is provided with a via hole, and the plastic tube is embedded in the via hole;

a first through hole is provided at an interior of the plastic tube, the metal tube is embedded in the first through hole, a part of the metal tube is located at an exterior of the housing, the conductive sheet is connected to one end that is of the metal tube and that is located at an interior of the housing, and the conductive sheet is in contact with and electrically connected to a circuit board of the electronic device;

the button part comprises a button cap and a button shaft, a second through hole is provided at an interior of the metal tube, the button shaft penetrates through the second through hole, a first end of the button shaft is located at the exterior of the housing, and the button cap is connected to the first end of the button shaft; and the elastic piece is sleeved on the button shaft, one end of the elastic piece is connected to the button cap, the other end of the elastic piece is connected to the metal tube, and the button part is configured to move in an axial direction of the button shaft relative to the housing.

16. The electronic device according to claim 15, wherein the ECG button assembly further comprises a tube nut, and the tube nut is located at one end that is of the metal tube and that is away from the button cap;

the tube nut is provided with a threaded hole, and the metal tube and the tube nut are assembled in a threaded manner; and the conductive sheet is connected to a side that is of the tube nut and that is away from the metal tube.

17. The electronic device according to claim 15, wherein after passing through the conductive sheet, a second end of the button shaft is located at a side that is of the conductive sheet and that is away from the metal tube, a limiting part is provided at the second end of the button shaft, and the limiting part is disposed around the button shaft; and when the button part is in an initial state, the limiting part abuts against a surface of the side that is of the conductive sheet and that is away from the metal tube, and when the button part is pressed, the limiting part is detached from the conductive sheet.

18. The electronic device according to claim 15, wherein the housing comprises a metal layer and a plastic layer, and the plastic layer is located at a side that is of the metal layer and that faces the interior of the housing.

19. The electronic device according to claim 18, wherein a part of the plastic tube is located at an interior of the button cap, and in the axial direction of the button shaft, a distance between the button cap and the plastic tube is less than a distance between the button cap and the metal layer.

20. The electronic device according to claim 18, wherein the metal layer is provided with an opening, a side surface that is of the plastic tube and that faces the button cap is flush with a surface that is of the plastic layer and that faces the metal layer, the plastic tube is exposed from the opening, and a part that is of the metal tube and that is located at the exterior of the housing abuts against the side surface that is of the plastic layer and that faces the metal layer.

* * * * *